United States Patent [19]

Tsuda et al.

[11] 4,366,505
[45] Dec. 28, 1982

[54] INFORMATION FORMING APPARATUS

[75] Inventors: Shin Tsuda, Hasuda; Sadasuke Kurabayashi, Asaka; Minoru Ogata, Yokohama, all of Japan

[73] Assignee: Canon Kabushiki Kaisha, Tokyo, Japan

[21] Appl. No.: 75,113

[22] Filed: Sep. 13, 1979

[30] Foreign Application Priority Data

Sep. 20, 1978 [JP] Japan ............... 53-115652
Sep. 21, 1978 [JP] Japan ............... 53-117243

[51] Int. Cl.³ .................................................. H04N 7/12
[52] U.S. Cl. ......................................... 358/260; 358/288
[58] Field of Search .......................... 358/260, 261, 288

[56] References Cited

U.S. PATENT DOCUMENTS 3,588,329 6/1971 Monk ............................. 358/260
4,186,415 1/1980 Takaynma ..................... 358/260

Primary Examiner—Joseph A. Orsino, Jr.
Attorney, Agent, or Firm—Fitzpatrick, Cella, Harper & Scinto

[57] ABSTRACT

The present invention is featured, in the transmission of pixel (picture element) signals grouped into blocks defined in a series of pixel signals, by sending a control signal instead of said pixel signals when the pixel signals contained in a block are all white signals or sending pixel signals after modulation when black signals are present in said block thereby compressing the time required for transmission, also by selecting the maximum amplitude of said control signal larger than the maximum amplitude of said modulated pixel signals thereby enabling identification of said control signals from said pixel signals, and by sending, when the final black pixel signal in a black signal containing block is followed by consecutive white pixel signals, a control signal instead of such white pixel signals thereby achieving further compression of the transmission time.

8 Claims, 6 Drawing Figures

INFORMATION FORMING APPARATUS

BACKGROUND OF THE INVENTION

1. Field of the Invention

The present invention relates to an information forming apparatus capable of achieving a significant reduction in the transmission time by eliminating the redundancy in the pixel (picture element) signals divided into blocks defined in a series of pixel signals.

2. Description of the Prior Art

In order to reduce the time required for the transmission of image information for example in a facsimile system, there is already known an information forming process of dividing a series of pixel (picture element) signals into suitable blocks, attaching to each block an identification signal indicating whether said block contains black signals, and omitting the transmission of pixel signals in a block if such block does not contain black signals. However such conventional process is defective in that such identification signals which have to be attached to every block lead eventually to a longer transmission time and also to a lowered signal-to-noise ratio.

SUMMARY OF THE INVENTION

A first object of the present invention is to achieve a compression of the pixel signals by transmitting a control signal in case the pixel signals in a block are all white signals.

A second object of the present invention is to further improve the signal compression rate when a part of pixel signals in said block is white signals.

A third object of the present invention is to enable identification of said control signal from pixel signals.

A fourth object of the present invention is to reduce the running cost of the apparatus by the reduction of transmission time resulting from the aforementioned compression of pixel signals.

DESCRIPTION OF THE PREFERRED EMBODIMENTS

The present invention is featured, in the transmission of pixel (picture element) signals grouped into blocks defined in a series of pixel signals, by sending a control signal instead of said pixel signals when the pixel signals contained in a block are all white signals (first and second embodiments), sending a control signal instead of white pixel signals in case such white pixel signals follow the final black signal in a black signal containing block (second embodiment) and sending the pixel signals after modulation in case the block contains black signals thereby compressing the time required for the signal transmission.

The present invention will now be clarified in detail by the following description to be taken in conjunction with the attached drawings.

Figure 1:
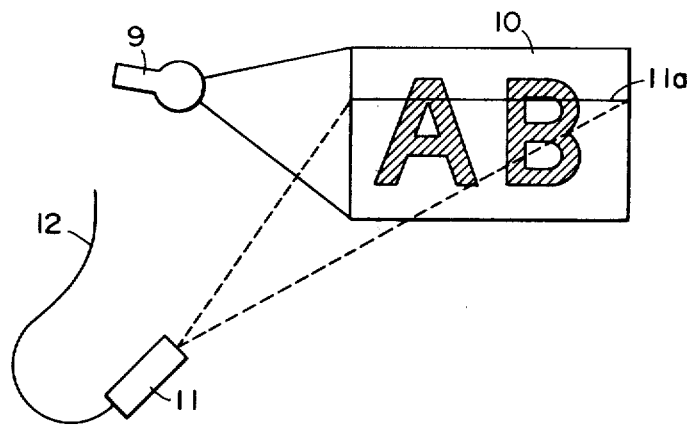
FIG. 1 is a perspective view indicating the scanning method by a scanner.
Figure 2:
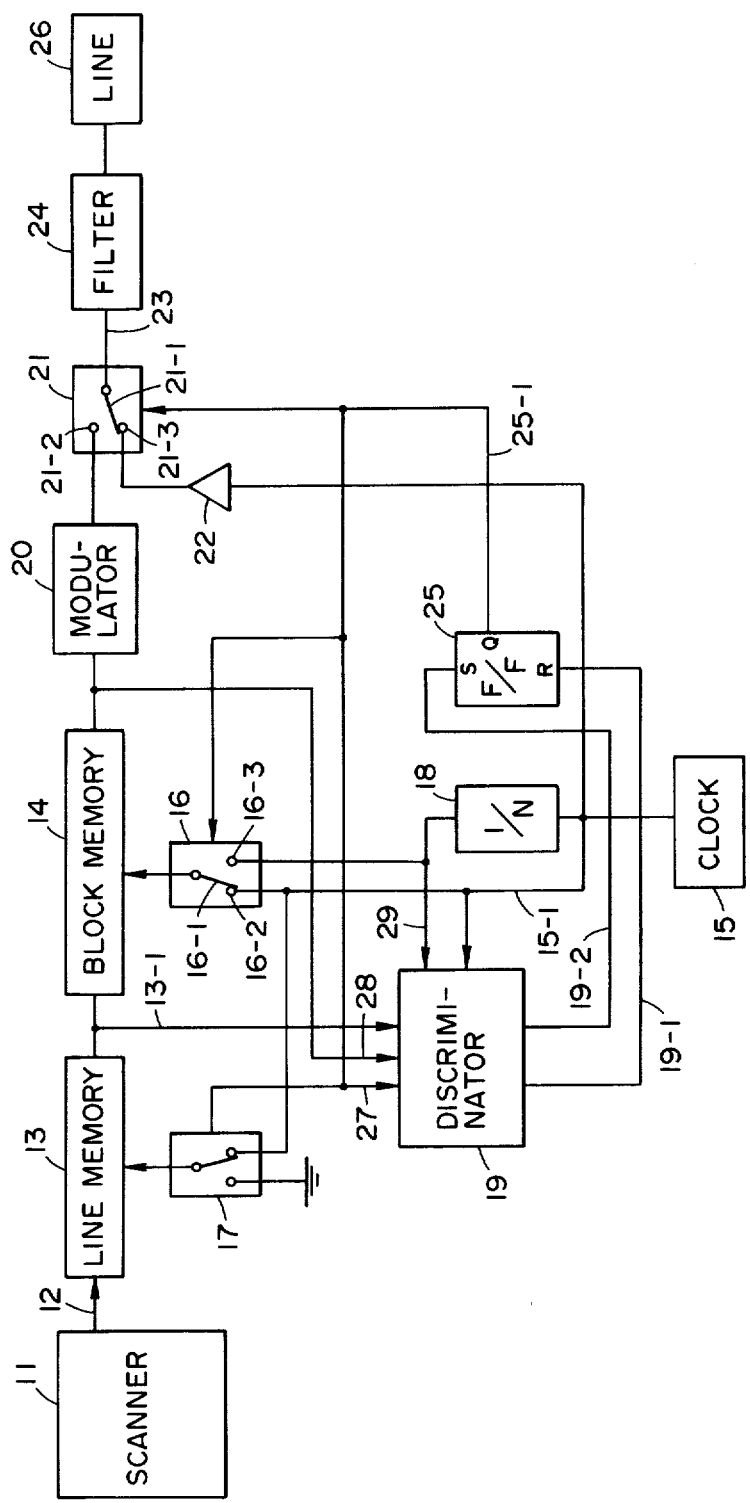
FIG. 2 is a block diagram of the information forming apparatus embodying the present invention.

FIG. 1 shows, in a perspective view, a structure for obtaining image signals by scanning an image, wherein an original 10 illuminated by a light source 9 by a scanner or original reading means 11 for example along a scanning line 11a, whereby said scanner 11 decomposes the image information recorded on said original 10 into pixels (picture elements) and releases the corresponding time-serial signals from a signal line 12. In FIG. 2 showing the block diagram of the information forming apparatus embodying the present invention there is provided a similar scanner 11 composed for example of a charge-coupled device for reading the information on the original 10 by a mechanism as shown in FIG. 1. The pixel signals thus obtained, composed of black signals corresponding to information or black areas on the originals and white signals corresponding to noninformation areas, are supplied on a signal line 12 in succession and stored in succession in a line memory 13, which is composed for example of a shift register of a capacity of 2,000 bits for storing the pixel signals corresponding to one scan line.

The pixel signals released from said line memory 13 are supplied to a block memory 14 which is composed of a shift register of a capacity for example of 8 bits, i.e. a capacity enough for dividing the pixel signals of a scan line into n blocks. There is provided a clock pulse generator 15 for generating clock pulses of a frequency f, which are supplied directly to a contact 16-2 of a switch 16 and through a frequency divider 18 (a ¼ divider in the present embodiment) to a contact 16-3 of said switch 16. The aforementioned line memory 13 and block memory 14 receive, as the shift pulses through a signal line 15-1, the above-mentioned clock pulses of a frequency f or f/4 according to whether a contact member 16-1 of said switch 16 is connected to the contact 16-2 or 16-3.

A discriminator 19 is provided for identifying whether the pixel signals of one block (8 bits in this case) transferred from said line memory 13 to said block memory contain black signals or are composed solely of white signals, said discriminator releasing a high level signal on the signal line 19-1 while maintaining the signal line 19-2 at the low signal level when the pixel signals stored in the block memory 14 contain black signals, and releasing a high level signal on the signal line 19-2 while maintaining the signal line 19-1 at the low signal level when said pixel signals are all white signals. The details of the structure of such discriminator will be explained later in relation to FIG. 5.

The pixel signals released from said block memory 14 are supplied, after modulation in a modulator 20, to a contact 21-2 of a switch 21, of which another contact 21-3 receives the clock pulses of the aforementioned frequency f from said clock pulse generator 15 through an amplifier 22, whereby there are released, on a signal line 23, the pixel signals modulated by the modulator 20 or the clock pulses amplified by the amplifier 22 respectively when a contact member 21-1 of said switch is connected to the contact 21-2 or the contact 21-3 thereof.

The signals supplied to the signal line 23 in this manner are forwarded to an external line such as a telephone line 26 through a filter 24 for limiting the frequency band. There is provided a flip-flop 25 of which set terminal S and reset terminal R are respectively connected to said signal lines 19-2 and 19-1, and of which set output is supplied to the aforementioned switches 16, 21 thereby controlling said switches in such a manner as to connect the contact member 16-1 with the contact 16-2 of the switch 16 and the contact member 21-1 with the contact 21-3 of the switch 21 as shown in FIG. 2 when the set output signal is released, and to connect said contact member 16-1 with the contact 16-3 and said contact member 21-1 with the contact 21-2 when said set output signal is not released.

Figure 3:
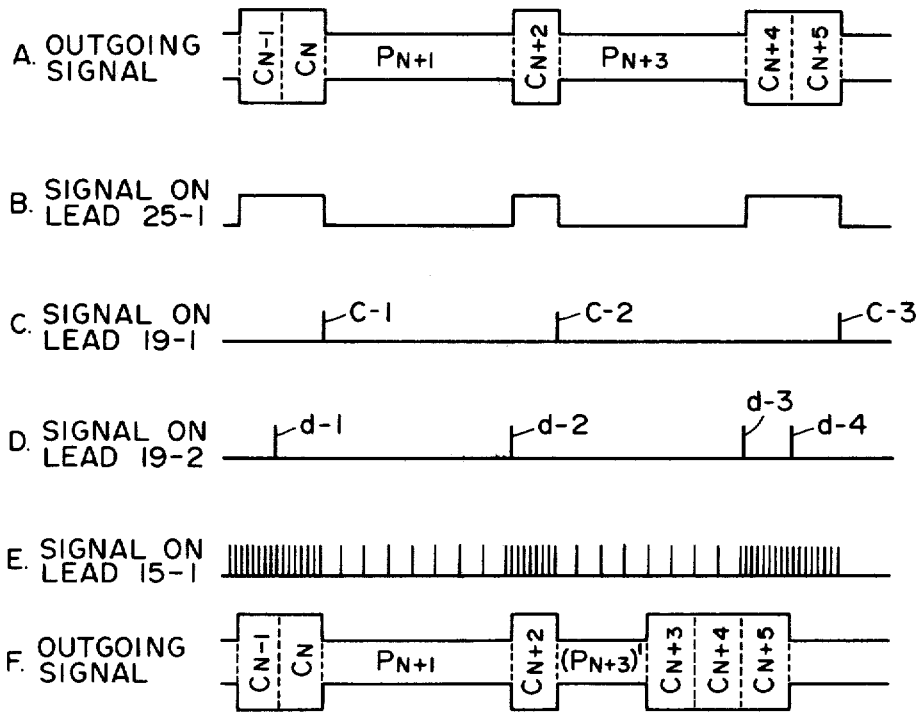
FIG. 3A is a signal chart showing the outgoing signals obtained in a first embodiment of the present invention.
FIGS. 3B to 3E are signal charts showing the signals in the various parts of said information forming apparatus shown in FIG. 2.
FIG. 3F is a signal chart showing the outgoing signals obtained in a second embodiment of the present invention.

In the following there will be given a detailed explanation on the function of the above-explained information forming apparatus, while making reference to FIGS. 3 and 4.

Figure 4:
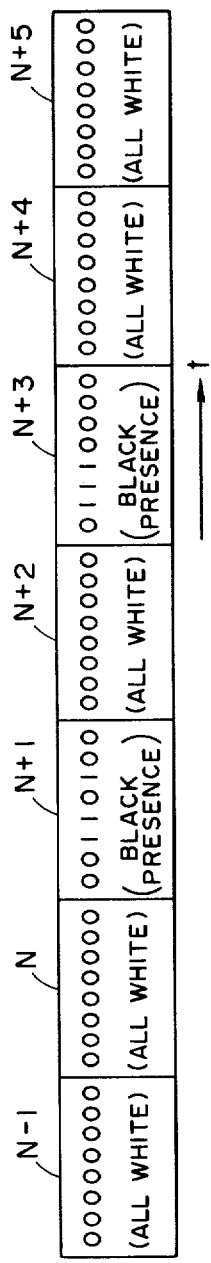
FIG. 4 is an explanatory chart showing a series of pixel signals divided into 8-bit blocks.

As an example, FIG. 4 shows seven blocks of signals constituting a part of pixel signals stored in the line memory 13, of which blocks N−1, N, N+2, N+4 and N+5 are solely composed of white signals "0" while the blocks N+1 and N+3 contain black signals "1", and it is assumed that these blocks are transferred in succession from the block N−1 to the block memory 14. When the 8-bit pixel signals constituting the block N−1 are stored in the block memory 14, the discriminator 19 identifies the all white state of said signals and releases a signal on the signal line 19-2 to set the flip-flop 25, whereby the contact members 16-1, 21-1 of the switches 16, 21 are controlled in the state shown in FIG. 2. Thus the clock pulses of the frequency f are supplied as the shift pulses to the memories 13, 14 thereby transferring the pixel signals of the block N from the line memory 13 to the block memory 14, and at the same time the clock pulses amplified by the amplifier 22 are supplied, through the switch 21 and the filter 24, to the external line 26.

In this manner 8 shift pulses of the frequency f are supplied to the memories 13, 14 while 8 amplified clock pulses (hereinafter called control signal) are supplied to the external line as shown by $C_{N-1}$ in FIG. 3A, and in response to said shift pulses the pixel signals of the block N are transferred from the line memory 13 to the block memory 14. As the pixel signals of said block N are all white, the discriminator 19 releases, after said 8-bit shifting, a signal d-1 indicating "all white" on the line 19-2 as shown in FIG. 3D thereby maintaining the flip-flop 25 in the set state. Consequently the switches 16 and 21 are maintained in the same state as before, whereby the control signal $C_N$ is emitted in continuation as shown in FIG. 3A. The amplitude of said control signal is increased by the amplifier 22 to the double of the maximum amplitude of the output signal from the modulator 20.

Such control signal is easily identifiable at the signal receiving side. Although the control signal in the present embodiment is composed of a sinusoidal wave of an amplitude twice as large as that of the modulated pixel signals, the object of the present invention can also be achieved by other forms of the control signal which can be identified from the pixel signals for example by phase difference, signal pattern, signal continuation time or combinations thereof.

During the emission of said control signal $C_N$ the pixel signals of the block N+1 are transferred to the block memory 14, and, after the completion of said 8-bit transfer, the discriminator 19 releases a signal C-1 on the line 19-1 as shown in FIG. 3C to reset the flip-flop 25, whereby the contact members 16-1, 21-1 of the switches 16, 21 are shifted to the contacts 16-3 and 21-2 respectively. Consequently the 8-bit pixel signal stored in the block memory 14 are supplied in succession to the modulator 20 in response to the clock pulses of the divided ¼ frequency, whereby the modulated pixel signals ($P_{N+1}$ shown in FIG. 3A) are emitted to the line through the switch 21. In the present embodiment the time for the control signal emission is equal to ¼ of the time required for emitting the pixel signals of one block. Upon completion of the emission of the pixel signal of the block N+1, the discriminator 19 identifies the 8-bit pixel signals of the block N+2 and releases a signal d-2 indicating the all white state to again set the flip-flop 25, whereby the control $C_{N+2}$ corresponding to the block N+2 is emitted as shown in FIG. 3A.

The signal emission for the subsequent blocks N+3, N+4 and N+5 is conducted in a similar manner as shown in FIG. 3A.

In the foregoing embodiment the pixel signals obtained from the scanner 11 are stored in the line memory 13 of a capacity corresponding to one scan line, but said memory can be of a larger or smaller capacity as long as it can transfer the pixel signals of one block to the block memory 14.

Figure 5:
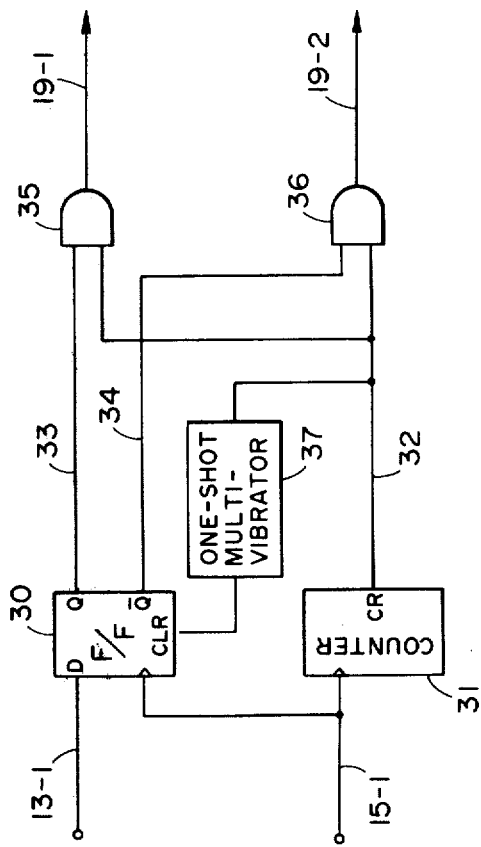
FIG. 5 is a circuit diagram showing a first embodiment of the discriminator shown in FIG. 2.

FIG. 5 shows an example of the structure of the discriminator 19, wherein 30 is a flip-flop and 31 is a counter releasing a carry signal CR upon counting "8". Said flip-flop 30 and counter 31 receive the clock pulses as the shift pulses through the aforementioned signal line 15-1, whereby said counter 31 releases a carry signal CR on a signal line 32 upon receipt of every 8 clock pulses.

The input port D of said flip-flop 30 is connected the aforementioned signal line 13-1 which is in the high or low signal level respectively corresponding to the black or white signal. Thus, in case the pixel signals supplied to the flip-flop 30 in synchronization with 8 clock pulses supplied to the counter 31 contain at least one black signal, said flip-flop 30 is shifted to the set state, releasing a high level signal on the line 33.

On the other hand, in case said 8 pixel signals do not contain black signals, the signal line 34 remains at the high signal level.

The above-mentioned carry signal CR is supplied to AND gates 35, 36 which are respectively connected to said signal lines 33, 32.

In this manner there is obtained a pulse signal on the signal line 19-2 or 19-1 respectively when the 8 pixel signals are all white or when they contain at least one black signal. A one-shot multi-vibrator 37 is provided to clear said flip-flop 30 by a slightly delayed carry signal.

As detailedly explained in the foregoing, the information forming apparatus constituting the first embodiment of the present invention, emitting the control signals only instead of all white blocks, allows reduction of the number of control signals, thereby reducing the transmission time and improving the signal-to-noise ratio.

In the following there will be given an explanation on the second embodiment of the present invention, wherein the signal emission for the black-containing blocks such as N+1 and N+3 shown in FIG. 4 is initiated by the emission of modulated pixel signal and is switched to the emission of control signal upon completion of the emission of all the black signals contained in said block. The pixel signals of one scan line can be reconstructed at the signal receiving side, by considering said control signal as a block end signal.

More specifically, in case of the block N+3 (01110000) containing consecutive 4-bit white signals after the final black signal, the emission of control signal is initiated after the emission of modulated pixel signals for the initial 4 bits containing black signals. In this manner the 4-bit white signals can be replaced by 2-bit control signal to save the transmission time for 2 bits.

Figure 6:
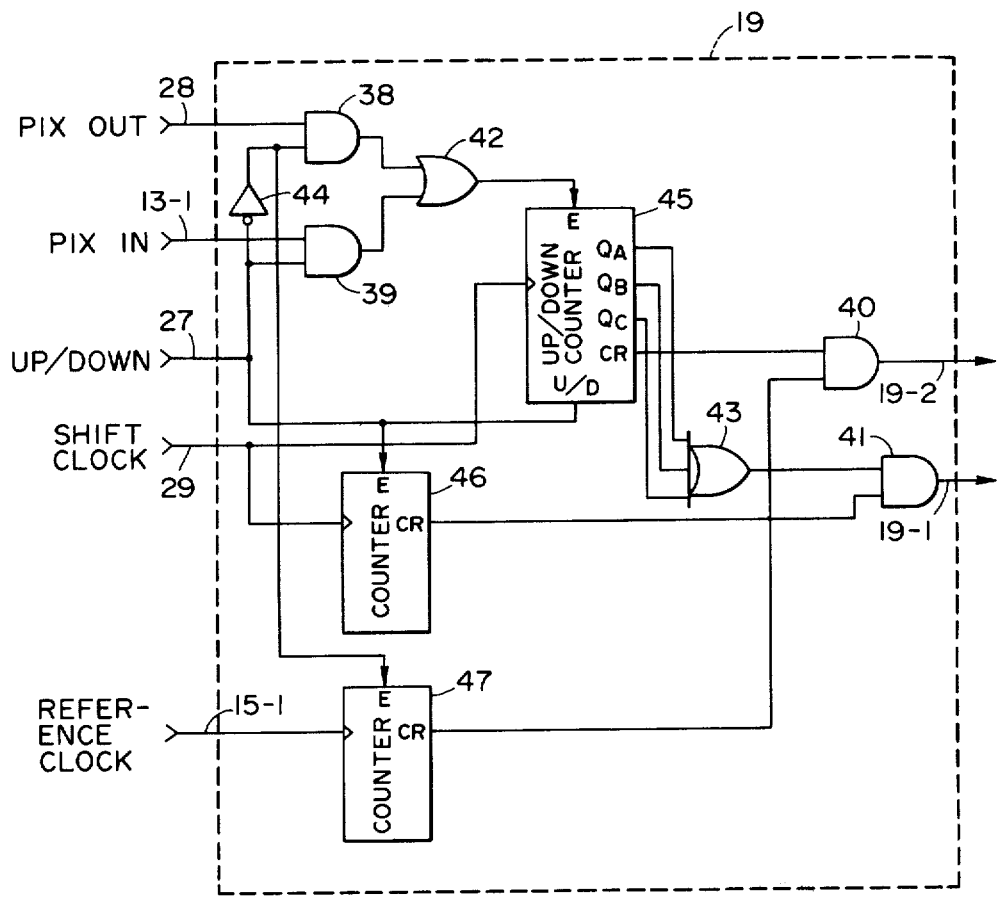
FIG. 6 is a circuit diagram showing a second embodiment of the discriminator shown in FIG. 2.

The above-explained operation for the block N+3 shown in FIG. 4 provides the outgoing signal shown in FIG. 3F, achieving a higher compression rate than in the first embodiment as represented in FIG. 3A (the signal $(P_{N+3})' + C_{N+3}$ being shorter by 2 bits than the signal $P_{N+3}$). The object of such second embodiment can be achieved in the block diagram of FIG. 2 by a discriminator 19 shown in FIG. 6, wherein there are shown AND gates 38-41, OR gates 42, 43, an inverter 44, an up-down counter 45, an octonal counter 46 and a quaternary counter 47. The AND gate 38 receives at an input port thereof a PIX OUT signal through a line 28 and at the other input port thereof an up-down signal through a line 27 and the inverter 44.

Also the AND gate 39 receives at an input port thereof a PIX IN signal through a line 13-1 and at the other input port thereof the up-down signal through the line 27. The outputs of said AND gates 38, 39 are supplied to the OR gate 42. The octonal counter 46 receives the shift clock pulses from the line 29 and the up-down signal from the line 27, while the quaternary counter 47 receives the clock pulses from the line 15-1 and the inverted up-down signal from the inverter 44.

The up-down counter 45 receives the shift clock pulses from the line 29, up-down signal from the line 27 and the output signal from the OR gate 42, and releases binary, quaternary and octonal signals respectively from the output ports QA, QB and QC, said signals being supplied to the OR gate 43. The AND gate 40 receives at an input port thereof the signal released from the carry terminal CR of said up-down counter 45 and at the other input port thereof the signal released from the carry terminal CR of the octonal counter 46, whereby the signal line 19-1 provides a signal indicating the presence of black signals.

The function of the above-explained circuit is as follows. In response to the pixel signals containing black signals, the flip-flop 25 (FIG. 2) provides an "up" signal through the line 27 to the AND gate 39, up-down counter 45 and octonal counter 46. Also because of the presence of black signal of at least 1 bit, the line 13-1 assumes the high signal level to open the AND gate 39 and OR gate 42 and to enable the up-down counter 45, which thus initiates the count-up function to also activate the OR gate 43. Also upon completion of 8-bit shift the octonal counter 46 releases the carry pulse CR to open the AND gate 41, thus allowing the release of signals c-1, c-2 etc. on the line 19-1 shown in FIG. 3C.

Then during the emisson of pixel signals containing black signals, the flip-flop 25 (FIG. 2) releases a "down" signal through the line 27 to the inverter 44, AND gate 38, up-down counter 45 and quaternary counter 47. Also upon completion of the emission of black signals contained in a block, the up-down counter 45 releases a high level signal from the terminal CR thereof to the AND gate 40. On the other hand upon completion of the 4-bit shift the quaternary counter 47 releases a carry pulse CR to open the AND gate 40 thereby allowing the release of pulses d-1, d-2 etc. from the line 19-2 as shown in FIG. 3D.

As explained in the foregoing, the present invention in the second embodiment thereof is featured by dividing the pixel signals of a scan line into plural blocks, and sending modulated pixel signals in case the block contains black signals and, upon completion of sending the final black signal in said block, a control signal instead of the remaining white signals. Also in case the block is composed solely of white pixel signals, the emission of pixel signals is completely replaced by the emission of the control signal. In this manner it is rendered possible, in comparison with the foregoing first embodiment, to more effectively eliminate the white signal portion, thereby achieving a more efficient transmission and further reducing the running cost of the apparatus.

What we claim is:

1. An information forming apparatus comprising:
   memory means for storing a series of picture element (pixel) signals, each pixel signal including a first signal representative of black information and/or a second signal representative of white information;
   dividing means for dividing said pixel signals stored in said memory means into blocks each composed of plural pixel signals of a predetermined number; and
   means for controlling the transmission of the pixel signals stored in said memory means in such a way that when the pixel signals in a block terminate with the first signal, all the pixel signals in a block are modulated and transmitted, and when the pixel signals in a block include the first signal or signals therein and terminate with the second signal, all the pixel signals or the pixel signal existing before the last first signal in the block, if existing, are modulated and transmitted including the last first signal and the second signals of the second signal existing after the last first signal in the block are not transmitted, but only a control signal capable of being distinguished from the second signal to identify the termination of the block is transmitted, and when the pixel signals in a block don't include any first signal in the block, all the second signals as the pixel signals are not transmitted, but only the control signal is transmitted.

2. An information forming apparatus according to claim 1 further comprising means for producing and transmitting a control signal representative of termination of the block, said control signal being produced after the latest first signal in spite of existence of subsequent second signal or signals in the block.

3. An information forming apparatus according to claim 1 wherein said control signal has a maximum amplitude greater than that of the modulated pixel signals.

4. An information forming apparatus comprising:
   memory means for storing a series of picture element (pixel) signals, each pixel signal including a first signal representative of black information and/or a second signal representative of white information;
   dividing means for dividing said pixel signals stored in said memory means into blocks each composed of a predetermined plural number of pixel signals;
   means for producing and transmitting a control signal distinguishable from the second signal to identify the termination of the block in the event that the block is terminated with the second signals in succession, said control signal having a maximum amplitude greater than that of the modulated pixel signals; and means for modulating and transmitting all said pixel signals in a block in the event that the block is terminated with the first signal or the second signal in non-succession.

5. An information forming apparatus comprising:

memory means for storing a series of picture element (pixel) signals, each pixel signal including a first signal representative of black information and/or a second signal representative of white information;

dividing means for dividing said pixel signals stored in said memory means into blocks each composed of plural pixel signals of a predetermined number; and means for controlling the transmission of the pixel signals stored in said memory means in such a way that when the pixel signals in a block terminate with the first signal, all the pixel signals in a block are modulated and transmitted, when the pixel signals in a block include the first signal or signals therein and terminate with the second signal, all the pixel signals or the pixel signal existing before the last first siganl, if existing, are modulated and transmitted including the last first signal and the second signals or the second signal existing after the last first signal in the block are not transmitted, but only a control signal capable of being distinguished from the second signal to identify the termination of the block is transmitted, and when the pixel signals in block include no first signal in the block, none of the second signals as the pixel signals are transmitted, but only the control signal is transmitted;

counting means for counting the number of first signals in the block divided by said dividing means; and means for producing and transmitting a control signal representative of termination of the block, said control signal being produced when the transmitted first signal is equal to the number of first signals counted by said counting means.

6. An information forming apparatus according to claim 5 wherein said counting means comprises an up-down counter for counting up the number of first signals in the block and counting down the number of first signals transmitted.

7. An information forming apparatus comprising:

memory means for storing a series of picture element (pixel) signals, each pixel signal including a first signal representative of black information and/or a second signal representative of white information;

dividing means for dividing said pixel signals stored in said memory means into blocks each composed of plural pixel signals of a predetermined number;

counting means for counting the number of first signals in the block divided by said dividing means;

means for producing and transmitting a control signal representative of termination of the block, said control signal being produced when the transmitted first signal is equal to the number of first signals counted by said counting means; and means for inhibiting the operation of said control signal producing and transmitting means and for modulating and transmitting all pixel signals in the event that the block is terminated with the first signal or the second signal in non-succession.

8. An information forming apparatus according to claim 7 wherein said counting means comprises an up-down counter for counting up the number of first signals in the block and counting down the number of first signals transmitted.

* * * * *